(12) United States Patent
Livermore et al.

(10) Patent No.: US 7,556,215 B2
(45) Date of Patent: Jul. 7, 2009

(54) DATA STORAGE TAPE CARTRIDGE AND SYSTEM INCLUDING STORAGE TAPE HAVING A TRANSITION TAPE

(75) Inventors: Fred W Livermore, Stillwater, MN (US); Saeed A Fahimi, Bloomington, MN (US); G. Phillip Rambosek, Shafer, MN (US); Peter A. Ridl, Oakdale, MN (US); William J. Vanderheyden, Loveland, CO (US)

(73) Assignee: Imation Corp., Oakdale, MN (US)

( * ) Notice: Subject to any disclaimer, the term of this patent is extended or adjusted under 35 U.S.C. 154(b) by 630 days.

(21) Appl. No.: 11/318,117

(22) Filed: Dec. 23, 2005

(65) Prior Publication Data

US 2007/0145173 A1 Jun. 28, 2007

(51) Int. Cl.
*G11B 23/107* (2006.01)
(52) U.S. Cl. .................................. 242/348.2; 360/132
(58) Field of Classification Search .............. 242/332.4, 242/348, 348.2, 532.6; 360/132
See application file for complete search history.

(56) References Cited

U.S. PATENT DOCUMENTS

| | | | |
|---|---|---|---|
| 3,650,378 A | 3/1972 | Kakiuchi et al. | |
| 3,857,531 A | 12/1974 | Jantzen | |
| 4,775,115 A | 10/1988 | Gelardi | |
| 5,053,902 A | 10/1991 | Kato | |
| 5,209,425 A | 5/1993 | Krabbenhoft et al. | |
| 5,262,918 A | 11/1993 | Tannert | |
| 5,280,403 A | 1/1994 | Martin | |
| 5,465,187 A | 11/1995 | Hoge et al. | |
| 5,969,913 A | 10/1999 | Vanderheyden et al. | |
| 6,057,980 A | 5/2000 | Todd et al. | |
| 6,069,777 A | 5/2000 | Vanderheyden et al. | |
| 7,086,623 B2 * | 8/2006 | Sato et al. | 242/348.2 |
| 7,287,714 B2 * | 10/2007 | Nishiwaki | 360/132 |
| 2004/0159733 A1 * | 8/2004 | Sato et al. | 242/348 |
| 2006/0032959 A1 * | 2/2006 | Hiraguchi et al. | 242/332.4 |
| 2006/0163405 A1 * | 7/2006 | Nishiwaki | |
| 2007/0145172 A1 * | 6/2007 | Vanderheyden et al. | 242/332.4 |
| 2007/0272782 A1 * | 11/2007 | Tynan | 242/332.4 |

* cited by examiner

*Primary Examiner*—William A Rivera
(74) *Attorney, Agent, or Firm*—Eric D. Levinson

(57) ABSTRACT

A data storage tape cartridge is disclosed. The data storage tape cartridge includes a housing, a reel assembly including a hub rotatably disposed within the housing, a storage tape wound onto the tape reel assembly, and a leader attached to a leading end of the storage tape. In this regard, the storage tape includes a primary tape portion extending from the hub to a first end and a transition tape coupled to the first end of the primary tape portion and extending to a leading end, wherein the transition tape is thicker than the primary tape portion.

20 Claims, 7 Drawing Sheets

DATA STORAGE TAPE CARTRIDGE AND SYSTEM INCLUDING STORAGE TAPE HAVING A TRANSITION TAPE

THE FIELD OF THE INVENTION

The present invention generally relates to unwinding a storage tape in a tape drive system during read/write processing. More particularly, it relates to a storage tape including a stiffened transition tape that resists buckling during start-up of read/write processing.

BACKGROUND

Single reel data storage tape cartridges have been used for decades in the computer, I/O, and video fields. The single reel data storage tape cartridge continues to be an extremely popular form of recording large volumes of information for subsequent retrieval and use.

A single reel data storage tape cartridge generally consists of an outer shell or housing maintaining a single tape reel assembly and a length of magnetically coated data storage tape. The data storage tape is wrapped about a hub portion of the reel assembly and is driven through a defined path by a tape drive. The housing normally includes a separate cover and base, the assembled combination of which forms a tape access window at a forward portion of the housing. In this regard, a free end of the storage tape is typically secured to a leader tab that assists in guiding the storage tape from the housing through the tape access window. During storage, the leader tab is selectively retained at the tape access window.

During use, the tape drive engages the data storage tape cartridge enabling reading and writing of data onto and off of the data storage tape. Generally, upon engagement with the tape drive, the leader tab is captured by the drive and the storage tape is directed into engagement with the read/write head. Initially, the data storage tape is accelerated by the tape drive from a near rest condition to a "flying" condition associated with velocities of up to 200 inches per second. To this end, the tape drive will separately include various internal guides for defining a desired tape path of the data storage tape within the tape drive.

During read/write processing, the data storage tape interacts with the guides in the tape drive. This interaction creates wear on the guides and can potentially damage the data storage tape. In this regard, as the guides in the tape drive wear down, lateral movement of the data storage tape increases, contributing to increased reading/writing errors. In addition, the data storage tape can "buckle" from interaction with the guides. Buckled data storage tape can deviate slightly away from an expected location, or datum, such that the read/write head experiences difficulty in finding a desired data track on the storage tape. Further, buckled data storage tape can cause the read/write head to encounter tracking problems where the head "loses" a desired track, ultimately resulting in an increase in read/write errors.

FIG. 1 illustrates a portion of a prior art tape guide 10 interacting with a data storage tape 12. The tape guide 10 includes a tape contact face 14 and a guide flange 16. The guide flange 16 extends at an angle relative to the tape contact face 14. For example, for some known tape guides 10, the guide flange 16 is substantially orthogonal to the tape contact face 14, as illustrated, although other configurations of tape guides are also employed. The storage tape 12 includes a backside 18 that is guided along the tape contact face 14 in a longitudinal fashion (i.e., into and out of the page of FIG. 1), and includes an edge 20. As the storage tape 12 moves laterally relative to the tape contact face 14, the edge 20 contacts the guide flange 16. In some instances, this contact, in conjunction with continued lateral movement, causes the storage tape 12 to buckle (or micro-buckle) as shown along the edge 20. In many cases, buckling of data storage tape causes poor tracking performance and/or tape durability issues.

While not bound to this theory, the above-described "inward" movement of the tape edge 20 (i.e., buckling toward the tape contact face 14) resulting from contact with the guide flange 16, especially at tape start-up, is likely due to a layered composite structure of the data storage tape 12. In general terms, the data storage tape 12 comprises a base polymeric layer with a magnetic coating on a front side 22, and a separate anti-static/lubricating coating, for example, on the backside 18. The front side coating and the backside coating have different material properties that can cause an imbalance in tension relative to the two sides 18, 22 of the data storage tape 12. When the data storage tape 12 is wrapped about a longitudinally curved or circular tape contact face 14, for example, the bias toward the "in" direction is accentuated due to the imbalanced tension pulling the data storage tape 12 inward.

Single reel data storage tape cartridges are important data storage devices that maintain vast amounts of retrievable information. While the evolution of cartridge components, including the storage tape, have greatly improved data storage tape cartridge performance, other problems, including buckling of the data storage tape exist. Therefore, a need exists for a single reel data storage tape cartridge that minimizes buckling of the data storage tape during read/write processing.

SUMMARY

One aspect of the present invention relates to a data storage tape cartridge. The data storage tape cartridge includes a housing, a tape reel assembly including a hub rotatably disposed within the housing, a storage tape wound onto the tape reel assembly, and a leader attached to a leading end of the storage tape. In this regard, the storage tape includes a primary tape portion extending from the hub to a first end and a transition tape coupled to the first end of the primary tape portion and extending to a leading end, wherein the transition tape is thicker than the primary tape portion.

Another aspect of the present invention relates to a storage tape for use in a data storage tape cartridge housing a tape reel assembly including a hub. The storage tape includes a magnetically coated primary tape portion attached to the hub, and a transition tape coupled to the primary tape portion. In this regard, the transition tape is thicker by a factor of at least 1.5 relative to the primary tape portion.

Yet another aspect of the present invention relates to a method of unwinding storage tape from a tape reel assembly housed in a data storage tape cartridge inserted into a tape drive. The method includes providing the tape reel assembly with storage tape including a primary tape portion extending from the hub to a first end and a transition tape coupled to the first end of the primary tape portion and extending to a leading end, the transition tape being thicker than the primary tape portion, and a leader coupled to the leading end of the transition tape. The method additionally provides engaging the transition tape with a guide of the tape drive, and accelerating the transition tape through the guide. The method further provides passing the transition tape from the guide at a storage tape speed corresponding to a flying speed for the data storage tape.

Yet another aspect of the present invention relates to a data storage system utilizing an intermediate tape leader. The system includes a data storage device, a primary tape portion, a leader, and a transition tape. In this regard, the transition tape connects the leader to the primary tape portion, and a thickness of the transition tape is greater than a thickness of the primary tape portion.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DETAILED DESCRIPTION

Figure 1:
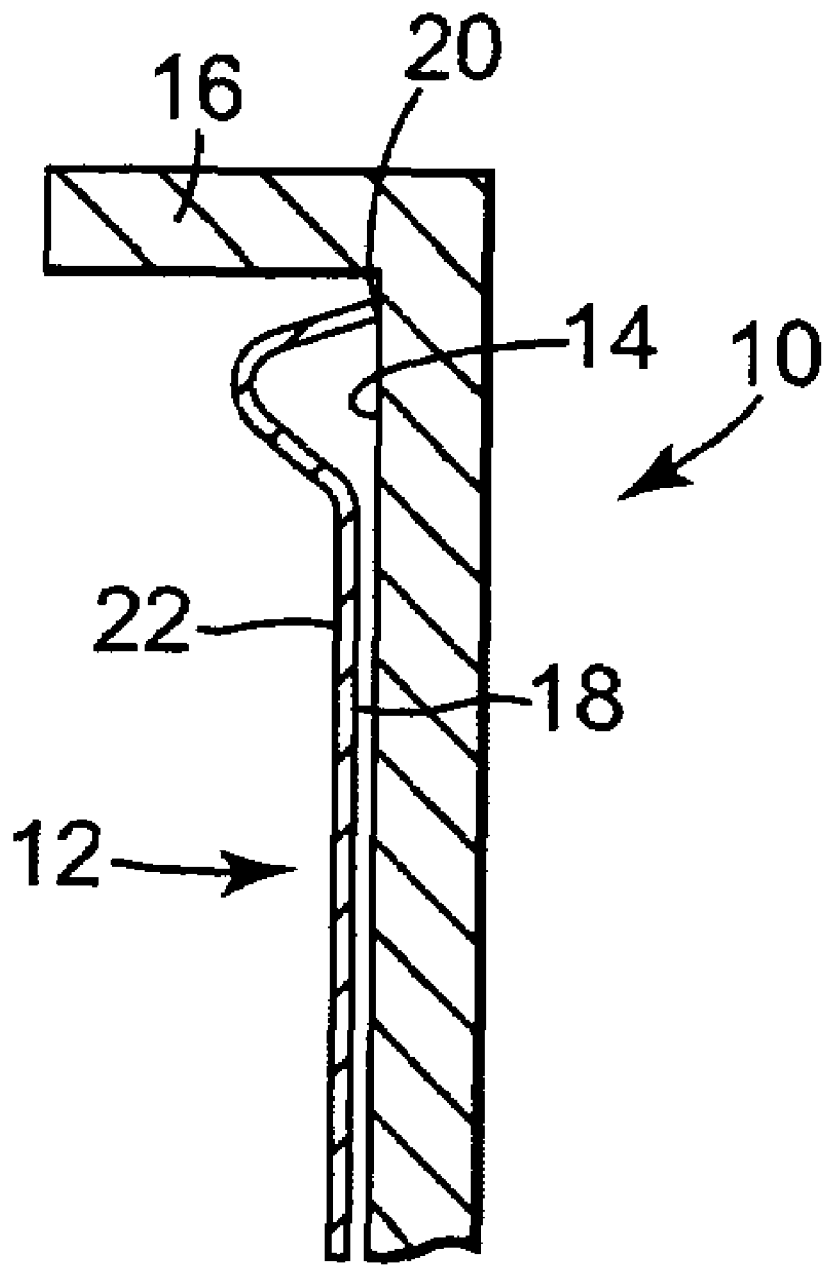
FIG. 1 illustrates a cross-sectional view of a portion of prior art tape guide interacting with a data storage tape.
Figure 2:
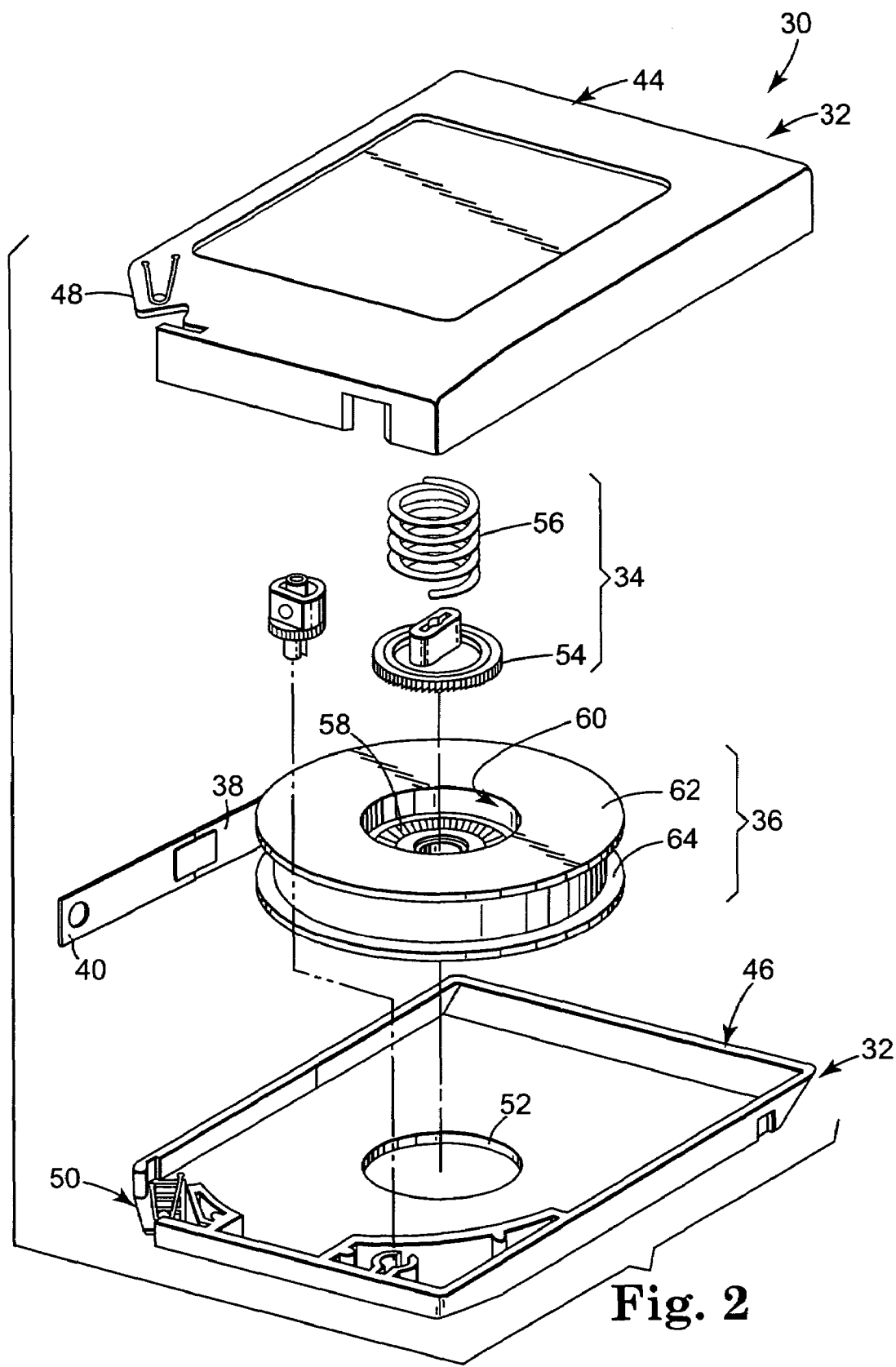
FIG. 2 illustrates a perspective, exploded view of a single reel data storage tape cartridge according to one embodiment of the present invention.

FIG. 2 illustrates a perspective, exploded view of an exemplary single reel data storage tape cartridge 30 according to one embodiment of the present invention. Generally, the single reel data storage tape cartridge 30 includes a housing 32, a brake assembly 34, a single tape reel assembly 36, a storage tape 38, and a leader 40. The single tape reel assembly 36 is disposed within the housing 32. The storage tape 38, in turn, is wound onto the single tape reel assembly 36 and is attached to the leader 40. As a point of reference, while a single reel data storage tape cartridge 30 is shown, the present invention is applicable to other cartridge configurations.

The housing 32 is sized to be received by a tape drive (not shown). Thus, the housing 32 exhibits a size of approximately 125 mm×110 mm×21 mm, although other dimensions are also acceptable. With this in mind, a first housing section 44 and a second housing section 46 define the housing 32. In one embodiment, the first housing section 44 forms a cover whereas the second housing section 46 forms a base. As used throughout this Specification, directional terminology such as "cover," "base," "upper," "lower," "top," "bottom," etc., is employed for purposes of illustration only and is in no way limiting.

The first and second housing sections 44 and 46, respectively, are sized to be reciprocally mated to one another and are generally rectangular, except for one corner 48 that is preferably angled and forms a tape access window 50. The tape access window 50 serves as an exit for the storage tape 38 through the housing 32. In this manner, a tape drive (not shown) captures the leader 40 and unwinds the storage tape 38 through the tape access window 50 during read/write processes. When the cartridge 30 is stored, the leader 40 is engaged with and covers the tape access window 50.

In addition to forming a portion of the tape access window 50, the second housing section 46 also forms a central opening 52. The central opening 52 facilitates access to the single tape reel assembly 36 by a drive chuck portion of the tape drive (not shown). During use, the drive chuck portion disengages the brake assembly 34 prior to rotating the tape reel assembly 36 for access to the storage tape 38. The brake assembly 34 is of a type known in the art and generally includes a brake 54 and a spring 56 co-axially disposed within the tape reel assembly 36. When the data storage tape cartridge 30 is idle, the brake assembly 34 is engaged and meshes with a brake interface 58 to selectively "lock" the single tape reel assembly 36 to the housing 32. In one embodiment, the brake interface 58 is a gear having teeth. Alternatively, other brake configurations are also acceptable.

The tape reel assembly 36 comprises a hub 60, an upper flange 62, and a lower flange 64. In one embodiment, the hub 60 defines the brake interface 58, and the upper and lower flanges 62, 64 extend in a radial fashion from opposing sides of the hub 60, respectively. In one embodiment, the upper flange 62 and the lower flange 64 are formed separately and are subsequently attached to the hub 60, thus defining a three-piece tape reel assembly 36, although other tape reel assembly configurations are also acceptable. Generally, the hub 60 and the flanges 62, 64 cooperate to retain multiple wraps of the storage tape 38 around the hub 60 and between the flanges 62, 64.

The leader 40 facilitates retrieval of the storage tape 38. In general terms, the leader 40 is shaped to provide a grasping surface for the tape drive (not shown) to manipulate in delivering the storage tape 38 to the read/write head. In one embodiment, the leader 40 is a leader block shaped to conform to the tape access window 50 and is mechanically coupled to an end of the storage tape 38. In another embodiment, the leader 40 is a leader tab that is adhesively spliced to the storage tape 38. In other embodiments, the leader 40 is replaced by other components, such as a dumb-bell shaped pin or other grasping devices that extend from the storage tape 38.

Figure 3:
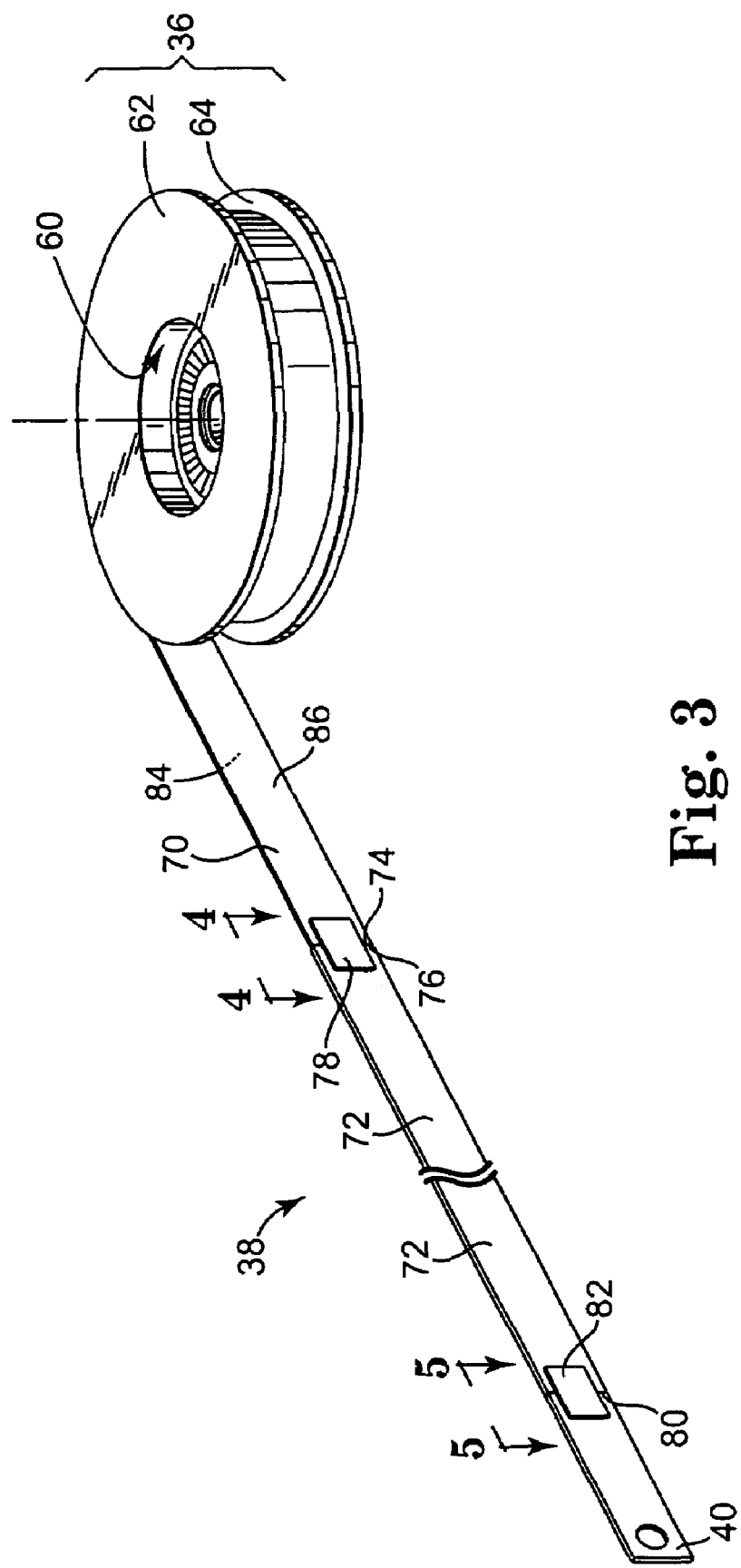
FIG. 3 illustrates a perspective view of a tape reel assembly including a storage tape according to one embodiment of the present invention.

FIG. 3 illustrates a perspective view of a length of the storage tape 38 extending out from the tape reel assembly 36 according to one embodiment of the present invention. In one embodiment, the storage tape 38 comprises a magnetically coated primary tape portion 70 and a transition tape 72 coupled to the primary tape portion 70.

In general, the primary tape portion 70 defines a hub end (not visible) in contact with a tape-winding surface of the hub 60 and a first end 74. The first end 74 of the primary tape portion 70 abuts against a trailing end 76 of the transition tape 72. In one embodiment, a transition tape splice 78 extends between the first end 74 of the primary tape portion 70 and the trailing end 76 of the transition tape 72.

In addition, the transition tape 72 defines a leading end 80. In one embodiment, the leading end 80 of the transition tape 72 abuts against the leader 40. In this regard, in one embodiment the leader 40 is a substantially planar, rigid film, although other leader tab shapes (i.e., blocks) are also acceptable. In one embodiment, a leader tab splice 82 extends between the leading end 80 of the transition tape 72 and the leader 40.

The primary tape portion 70 is a magnetic data storage tape that is flexible and adapted to wrap about the hub 60 of the tape reel assembly 36. In one embodiment, the primary tape portion 70 comprises a balanced polyethylene naphthalate (PEN) core that is coated on a front side 84 with a layer of magnetic material dispersed within a suitable binder system, and coated on a backside 86 with an electrostatically conductive material dispersed within a suitable binder system. In another embodiment, the primary tape portion 70 comprises a polyester (PET) core that is coated on a front side 84 with a layer of magnetic material dispersed within a suitable binder system, and coated on a backside 86 with an electrostatically conductive material dispersed within a suitable binder system. It will be recognized that other polymers, polymer blends, and layered polymeric cores can be utilized in forming the primary tape portion 70. In any regard, the magnetic material coated onto the front side 84 the primary tape portion 70 is configured to store electronic data for subsequent retrieval and use. With this in mind, the transition tape splice 78 is preferably coupled to the backside 86 of the primary tape portion 70.

The transition tape 72 is preferably flexible and adapted to wrap about outermost wrappings of the primary tape portion 70 wrapped about the hub 60. In one embodiment, the transition tape 72 is substantially similar to the primary tape portion 70 and comprises a balanced polyethylene naphthalate (PEN) core that is coated on a front side with a layer of magnetic material dispersed within a suitable binder system, and coated on an opposing backside with an electrostatically conductive material dispersed within a suitable binder system. In another embodiment, the transition tape 72 comprises a polyester (PET) core that is coated on a front side with a layer of magnetic material dispersed within a suitable binder system, and coated on a backside with an electrostatically conductive material dispersed within a suitable binder system, although the core can comprise other polymers, polymer blends, and/or polymeric layers. In a most basic embodiment, the transition tape 72 comprises a polyester (PET) core, although it is to be understood that it is desirable to dissipate electrostatic charges that eventually build up on a moving transition tape 72, usually via a coating dispersed on at least one side of the transition tape 72.

Figure 4:
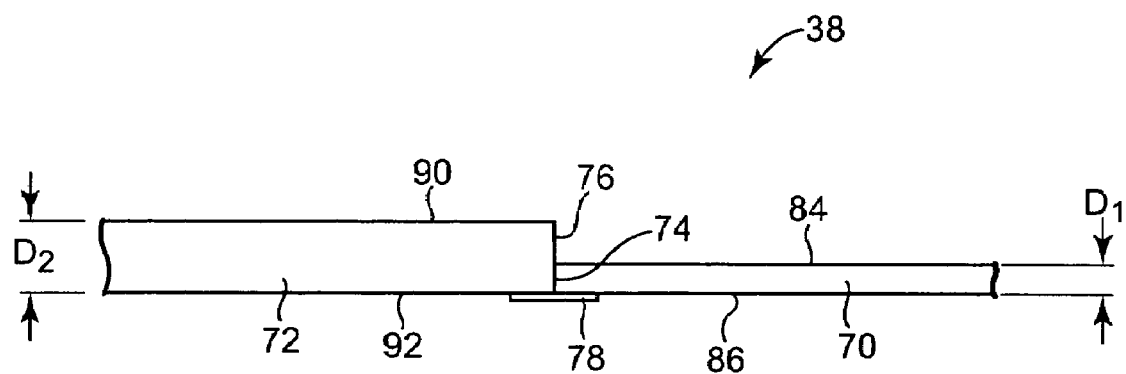
FIG. 4 illustrates a top plan view of a transition tape splice according to one embodiment of the present invention.

FIG. 4 illustrates a top plan view of the transition tape splice 78 according to one embodiment of the present invention. The transition tape splice 78 joins the primary tape portion 70 to the transition tape 72. In one embodiment, the first end 74 of the primary tape portion 70 abuts against the trailing end 76 of the transition tape 72 and the transition tape splice 78 adhesively joins the two ends 74, 76 together. In this regard, the transition tape splice 78 is an adhesive splice extending between the primary tape portion 70 and the transition tape 72, and preferably contacts the backside 86 of the primary tape portion 70.

In general, the transition tape splice 78 contacts and adheres to both the primary tape portion 70 and the transition tape 72. In this regard, it will be understood that the contact surfaces of the primary tape portion 70 and the transition tape 72 can be "energetically" structured to durably receive the transition tape splice 78. For example, in one embodiment the surfaces of the primary tape portion 70 and the transition tape 72 are locally coated with a primer adapted to adhesively accept the transition tape splice 78. In another embodiment, the surfaces of the primary tape portion 70 and the transition tape 72 are locally cleaned to be coating-free such that the transition tape splice 78 strongly adheres to the clean surfaces. As a point of reference, one suitable adhesive tape useful as a transition tape splice is available from NITTO DENKO, Osaka, Japan and is identified as Product No. 326.

In one embodiment, the primary tape portion 70 is an ultra-thin data storage tape, with the thickness being defined between the front side 84 and the backside 86. For example, in one embodiment the primary tape portion 70 defines a thickness $D_1$ in the range of 4-10 micrometers, and preferably the thickness $D_1$ has a range of 6-9 micrometers. For example, one such ultra-thin primary tape portion 70 defines a thickness $D_1$ of 300 micro-inches (7.6 micrometers). Another such ultra-thin primary tape portion 70 defines a thickness $D_1$ of 250 micro-inches (6.4 micrometers). In any regard, the primary tape portion 70 is substantially thinner than the stiff transition tape 72.

The transition tape 72 defines a front side 90 and a backside 92, with the transition tape 72 defining a thickness $D_2$ between the front side 90 and the backside 92. In one embodiment, the transition tape 72 thickness $D_2$ is thicker by a factor of at least 1.5 relative to the thickness $D_1$ of the primary tape portion 70. In one embodiment, the thickness $D_2$ of the transition tape 72 is between 1.5 to 10 times thicker than the thickness $D_1$, preferably the thickness $D_2$ is 2 to 8 times thicker than the thickness $D_1$, and more preferably the thickness $D_2$ is approximately five times thicker than the thickness $D_1$. For example, in one embodiment the thickness $D_1$ of the primary tape portion 70 is approximately 250 micro-inches (6.4 micrometers) and the thickness $D_2$ of the transition tape 72 is approximately 1,250 micro-inches (32 micrometers).

Figure 5:
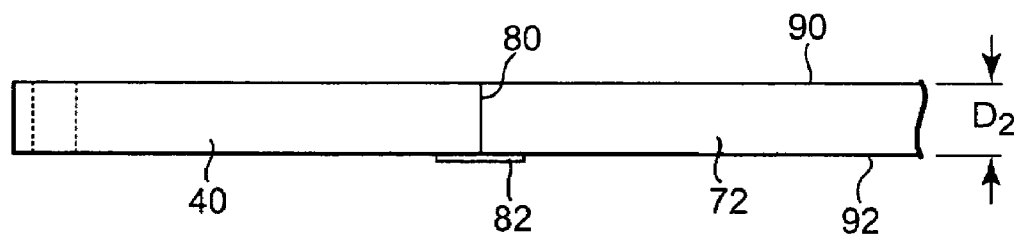
FIG. 5 illustrates a top plan view of leader tab splice according to one embodiment of the present invention.

FIG. 5 illustrates a top plan view of the leader tab splice 82 according to one embodiment of the present invention. In this regard, the leading end 80 of the transition tape 72 abuts against the leader 40, and the leader tab splice 82 extends between the transition tape 72 and the leader 40. As a point of reference, in one embodiment the transition tape 72 defines thickness $D_2$ and the leader 40 defines a thickness that is approximately equal to $D_2$, although the leader 40 can be either thicker or thinner than the thickness $D_2$ of the transition tape 72.

For example, the leader 40 can comprise a leader block that is significantly thicker than the thickness $D_2$ of the transition tape 72. In this regard, when the leader 40 is a leader block, the leader block is mechanically coupled (i.e., clamped) to the leading end 80 of the transition tape 72. In other embodiments, the leader 40 comprises dumb bell shaped leaders, or other leaders attached to the leading end 80 of the transition tape 72, that facilitate retrieval of the storage tape 38 (FIG. 3) from the data storage tape cartridge 30 (FIG. 2).

The transition tape 72 preferably defines a length sufficiently long to enable the storage tape 38 (FIG. 3) to be accelerated through a system of guides in a tape drive (described below) such that a lateral location of the storage tape 38 is stabilized when the primary tape portion 70 (FIG. 3) passes a read/write head. In addition, it is desired that the length of the transition tape 72 is not so long as to impede wrapping of the storage tape 38 onto the tape reel assembly 36 (FIG. 3). With this in mind, the transition tape 72 preferably defines a length of between 0.5 feet and 5 feet, more preferably the transition tape 72 defines a length of between 1 feet and 4 feet, and most preferably the transition tape 72 defines a length between approximately 2 feet and 3 feet.

Figure 6:
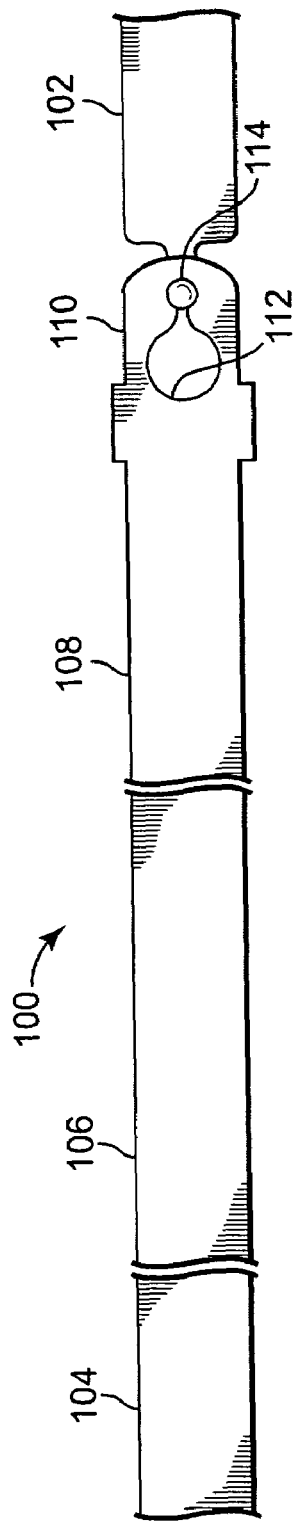
FIG. 6 illustrates a plan view of a storage tape coupled to a drive reel leader according to one embodiment of the present invention.

FIG. 6 illustrates a plan view of a storage tape 100 coupled to a drive reel leader 102 according to one embodiment of the present invention. In one embodiment, the storage tape 100 comprises a magnetically coated primary tape portion 104, a transition tape 106 coupled to the primary tape portion 104, and a leader 108 coupled to the transition tape 106. In this regard, the leader 108 includes a head 110 that defines a keyhole shaped aperture 112.

In general, drive reel leader 102 includes a coupling mechanism, such as a mushroom shaped button 114 on a free end of drive reel leader 102. In one embodiment, the mushroom shaped button 114 is insertable into the keyhole shaped aperture 112 formed by the head 110 during coupling of the storage tape 100 by a tape drive (not shown). Other embodiments of the present invention are not restricted to the use of a mushroom shaped button and a keyhole shaped aperture to accomplish the coupling process. For example, embodiments of the present invention may employ any type of coupling or linking mechanism that is consistent with the reading/writing process in tape drives and systems.

In one embodiment, the primary tape portion 104 is coupled to the transition tape 106 by an adhesive splice, and the transition tape 106 is coupled to the leader 108 by an adhesive splice, where the splices are similar to the splices 78, 82 (FIG. 3) described above. In this regard, it is noted that embodiments of the present invention are not restricted to the use of splicing tape to join portions/components of the storage tape 100. Embodiments of the present invention may utilize any means to join portions of the storage tape, including, but not limited to, using an adhesive solution or melting/welding the portions together. Alternatively, portions of the storage tape 100 are manufactured as one continuous piece.

Figure 7:
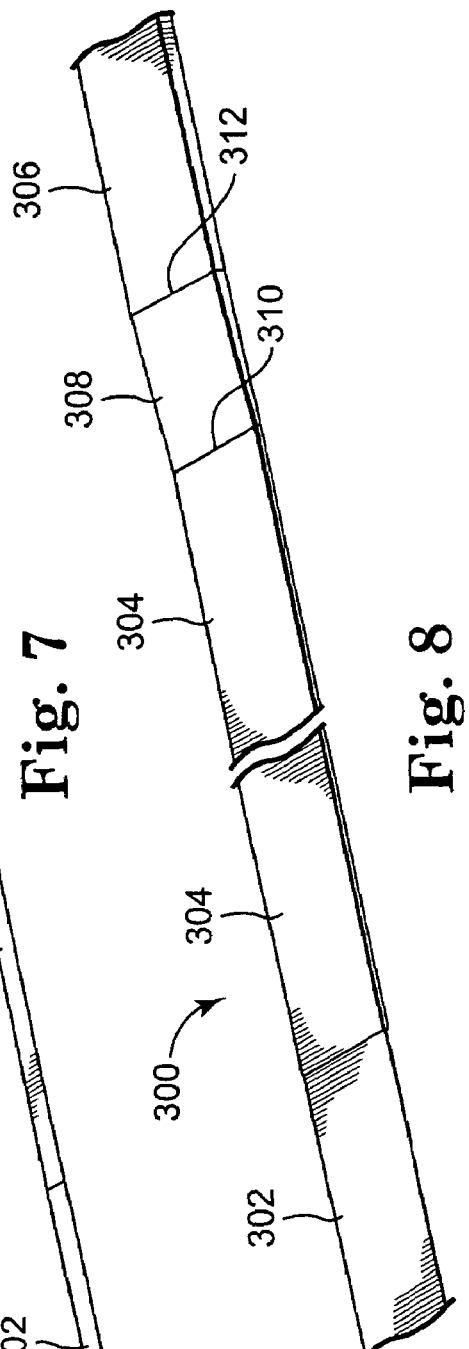
FIG. 7 illustrates a perspective view of a storage tape according to another embodiment of the present invention.

FIG. 7 illustrates a perspective view of a storage tape 200 according to one embodiment of the present invention. Storage tape 200 comprises a magnetically coated primary tape portion 202, a transition tape 204 coupled to the primary tape portion 202, a leader 206, and a taper 208 coupled between the transition tape 204 and the leader 206.

In one embodiment, the transition tape 204 includes the taper 208, and the taper 208 is tapered and reduces a step height (i.e., a thickness variation between components of the storage tape 200) between leader 206 and transition tape 204. The term "taper" in the context of this illustration means a gradual thickness reduction over a predetermined length of segment of, for example, the leader 206. In one embodiment, the taper 208 is a relatively short segment of leader 206. In other embodiments, the taper 208 may be any length to accomplish the purposes of embodiments of the present invention.

The leader 206 includes a head 201 and defines at least one aperture 212. In one embodiment, aperture 212 is a spacing aperture where spacing aperture 212 is positioned on leader 206 to receive a mushroom shaped button 114 (FIG. 6) during winding on a tape drive take-up reel. In this regard, leader 206 may define one or more spacing apertures. The number of spacing apertures is selected to reduce or eliminate tape pack impressions depends on the length of the leader 206 and the size of the mushroom shaped button. In addition, spacing apertures may be formed in a drive reel leader, such as drive reel leader 102 in FIG. 6.

Typically, leader 206 is approximately 18.5 inches long. However, embodiments of the present invention are not restricted to an 18.5-inch leader. Embodiments of the present invention may utilize a standard tape leader of any length that accomplishes the purposes of embodiments of the present invention.

In one embodiment, the transition tape 204 is, for example, 27 inches long. However, embodiments of the present invention are not limited to a 27-inch transition tape. Embodiments of the present invention may utilize a transition tape of any length that accomplishes the purposes of embodiments of the present invention. Furthermore, embodiments of the present invention are not limited to the use of only a single transition tape. Embodiments of the present invention may utilize a plurality of transition tapes to accomplish the process and system of embodiments of the present invention.

Figure 8:
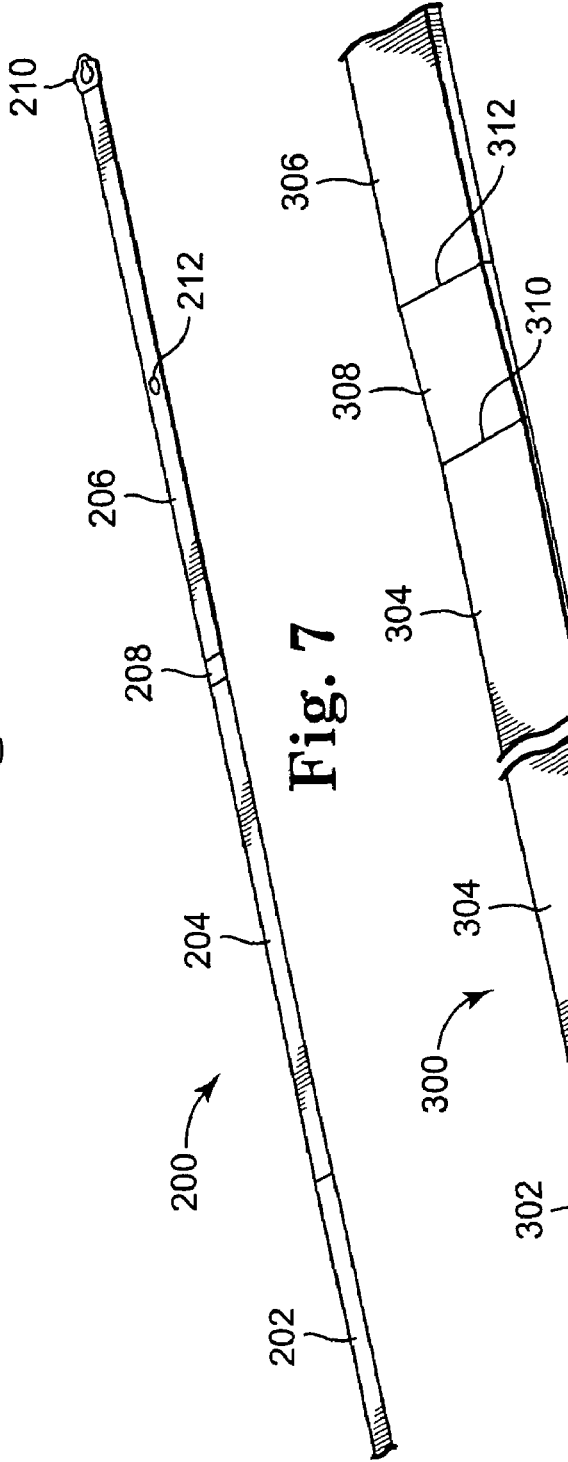
FIG. 8 illustrates a perspective view of another storage tape according to one embodiment of the present invention.

FIG. 8 illustrates a perspective view of a storage tape 300 according to one embodiment of the present invention. Storage tape 300 comprises a magnetically coated primary tape portion 302, a transition tape 304 coupled to the primary tape portion 302, a leader 306, and a taper 308 coupled between the transition tape 304 and the leader 306.

FIG. 8 provides an exemplary illustration of storage tape thickness shown in accordance with an embodiment of the present invention. For example, in one embodiment primary tape portion 302 has a thickness of 0.00025 of an inch, transition tape 304 has a thickness of 0.0007 of an inch, taper 308 has a thickness ranging from 0.00125 of an inch at a transition tape interface 310 to a thickness of 0.0082 of an inch at a leader interface 312, and leader 306 has a thickness of approximately 0.0082 of an inch. However, the thickness values or measurements listed above are not meant as limitations on embodiments of the present invention.

The thickness measurements of components of the storage tape 300 may be increased or decreased to implement embodiments of the present invention. Thus, FIG. 8 depicts relative thickness values of components of the storage tape 300 that are only intended to be illustrative. It should be appreciated by those skilled in the art that the present invention is not restricted to the thickness values mentioned, but may be implemented using any component thickness consistent with embodiments of the mechanism and system of the present invention. In addition, embodiments of the present invention provide for the transition tape 304 thickness value to be any value that is less than or equal to the leader 306 thickness value and greater than or equal to the primary tape portion 302 thickness value.

In an exemplary illustration, taper 308 defines a uniform taper from the transition tape 304 to the leader 306 in accordance with an embodiment of the present invention. In the context of the illustration, a uniform taper is a consistent, gradual height (i.e., thickness) reduction over a predetermined segment length. For example, in one embodiment taper 308 consistently and gradually reduces in height from 0.0082 of an inch at the leader interface 312 to 0.00025 of an inch at transition tape interface 310. Alternatively, only a portion of taper 308 is uniformly tapered, such that only three-quarters, one-half, or one-quarter of the length of taper 308 is uniformly tapered, and the remainder of the taper 308 is of a constant thickness value. Or, taper 308 may have a varied taper. In other words, taper 308 defines a thickness that varies over its length.

Figure 9:
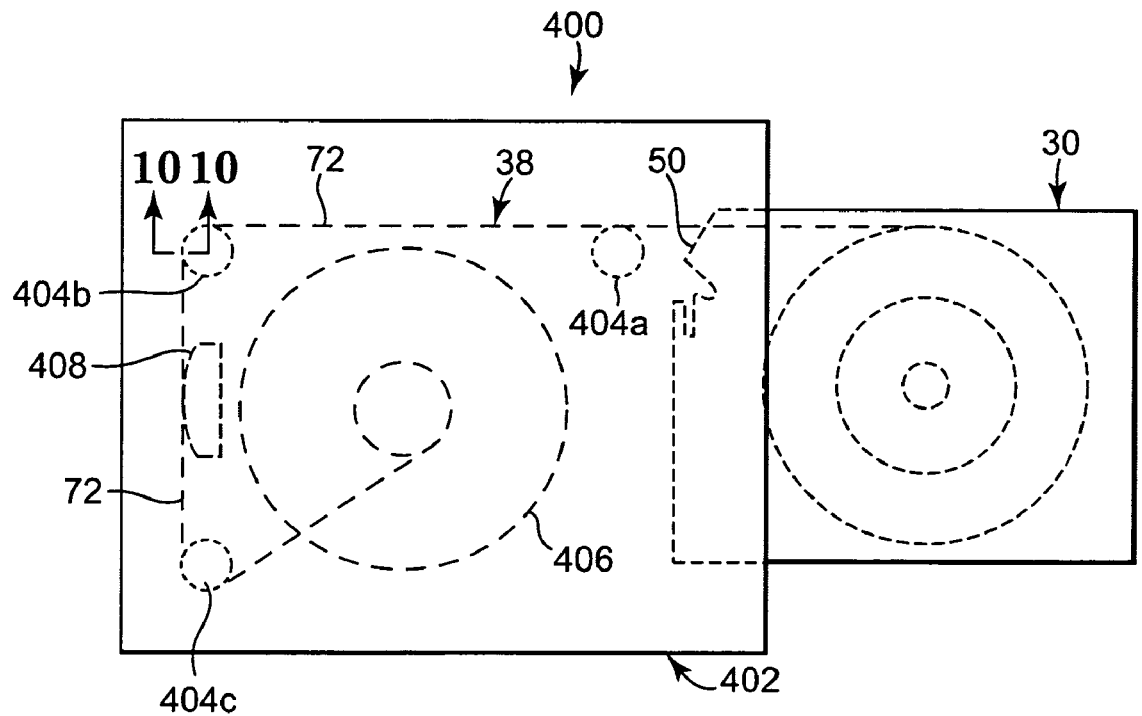
FIG. 9 illustrates a top plan view of a simplified data storage tape system according to one embodiment of the present invention.

FIG. 9 illustrates a top plan view of a simplified data storage tape system 400 according to one embodiment of the present invention. The data storage tape system 400 includes the data storage tape cartridge 30 inserted into a tape drive 402402. The tape drive 402 defines a plurality of guides 404a, 404b, 404c, a take-up reel 406, and a read/write head 408. The leader 40 (not shown) has been grasped by the tape drive 402 and fed to the take-up reel 406. In this regard, the storage tape 38 is unwound through the tape access window 50 of the data storage tape cartridge 30, and threaded across the guides 404a, 404b, and 404c. In this manner, the guides 404a-404c engage with and define a tape path for the storage tape 38 within the tape drive 402 that passes the storage tape 38 across the read/write head 408.

During start-up, the transition tape 72 is threaded along the guides 404a-404c, and a desired tape path for the storage tape 38 is defined. As a point of reference, as the storage tape 38 is threaded into the tape drive 402, the velocity of the storage tape 38 is low, for example on the order of approximately 10 inches per second. However, it is desired that the primary tape portion 70 (FIG. 3) achieve a speed across the read/write head 408 of up to approximately 200 inches per second. When the primary tape portion 70 is transported through the tape drive 402 at high speeds, air is entrained between the primary tape portion 70 and the guides 404a-404c, and a lateral position of the primary tape portion 70 is maintained in a stable orientation with a minimum of potentially damaging contact between the primary tape portion 70 and the tape drive 402.

To achieve these preferred primary tape portion 70 speeds within the tape drive 402, the storage tape 38 is accelerated from a near zero speed through the tape drive 402 (and consequently, through the guides 404a-404c), resulting in significant and possibly deleterious contact between the storage tape 38 and the guides 404a-404c during start-up. The stiff transition tape 72 that resists lateral buckling due to interaction with the guides 404a-404c solves the potential problem of damage to the primary tape portion 70 during start-up. The stiff transition tape 72 is accelerated through the guides 404a-404c while resisting bending and buckling when edges of the transition tape 72 contact flanges of the guides 404a-404c, eventually equilibrating to a stable lateral position relative to the guides 404a-404c, and thus establishing a stable lateral position of the accelerated storage tape 38 prior to the primary tape portion 70 "flying" across the read/write head 408, as described below.

Figure 10:
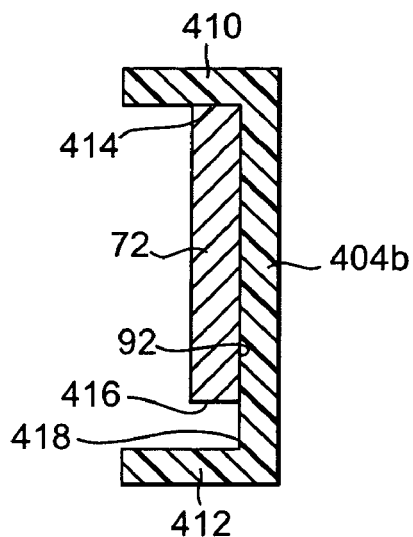
FIG. 10 illustrates a cross-sectional view of a transition tape interacting with a tape guide according to one embodiment of the present invention.

FIG. 10 illustrates the transition tape 72 interacting with the guide 404b during storage tape 38 (FIG. 9) start-up according to one embodiment of the present invention. The guide 404b defines a top flange 410 and a bottom flange 412. The transition tape 72 defines a width extending between a top edge 414 and a bottom edge 416. When the storage tape 38 is threaded through the tape drive 402 (FIG. 9), the backside 92 of the transition tape 72 drags along a face 418 of the guide 404b. In this regard, one or both of the edges 414, 416 of the transition tape 72 can touch the flanges 410, 412, respectively, of the guide 404b. In addition, during this start-up phase, the transition tape 72 will laterally translate between the flanges 410, 412 before reaching an equilibrium position between the flanges 410, 412.

As illustrated in FIG. 10, the backside 92 and the top edge 414 of the moving transition tape 72 are in contact with the face 418 and the top flange 410, respectively, of the guide 404b. During start-up, the transition tape 72 contacts the guide 404b and resists buckling and deformation due to forces delivered to the transition tape 72 from the guide 404b. Thus, the transition tape 72 absorbs the forces imparted to the storage tape 38, and eventually equilibrates to a stable lateral position between the flanges 410, 412, thus enabling the primary tape portion 70 (FIG. 3) to likewise equilibrate at a stable flying speed of approximately 200 inches per second between the flanges 410, 412.

In general terms, the transition tape 72 is thicker, stiffer, and resists lateral buckling relative to the primary tape portion 70 (FIG. 3). For example, during a typical read/write process, ultra-thin primary tape portion 70 having a thickness $D_1$ of approximately 250 micro-inches will buckle in response to a lateral force imparted by interaction with the guide flanges 410, 412 of approximately 3 grams force (i.e., $3 \times 10^{-3}$ Newtons). In contrast, the transition tape 72, having a thickness $D_2$ approximately five times the thickness $D_1$ of the primary tape portion 70, will not buckle in response to a lateral force imparted by interaction with the guide flanges 410, 412 for forces of approximately 20 grams force (i.e., $20 \times 10^{-3}$ Newtons). That is to say, forces delivered from a guide flange onto the transition tape 72 are insufficient to buckle the transition tape 72 during typical read/write processing of the data storage tape cartridge 30. The transition tape 72 is thicker, stiffer, and more rigid relative to the primary tape portion 70, and is, in general, at least 50% more resistant to lateral buckling than is the primary tape portion 70.

Figure 11:
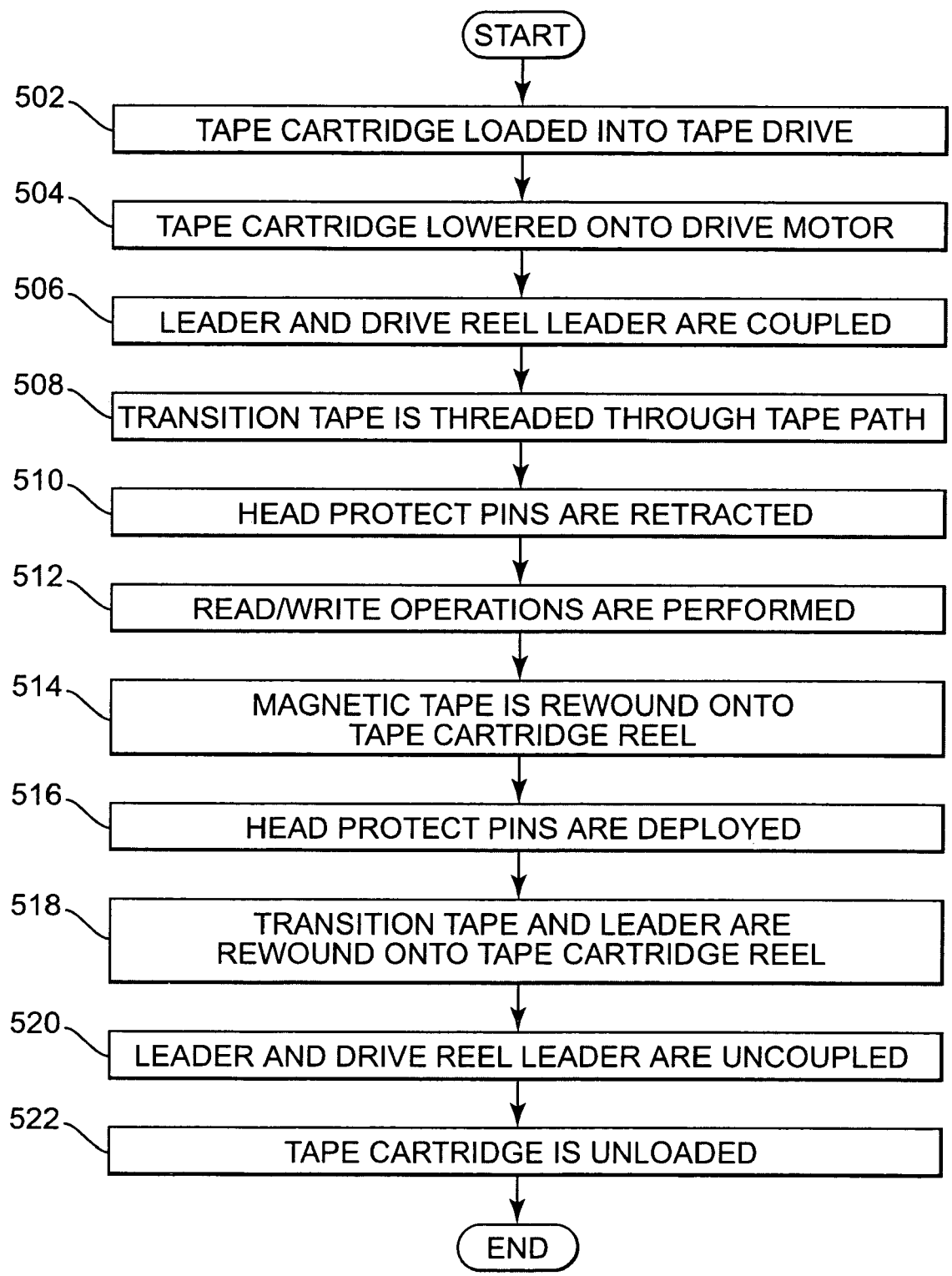
FIG. 11 illustrates a flowchart outlining an exemplary loading and unloading process of a tape cartridge into a tape drive according to one embodiment of the present invention.

FIG. 11 illustrates a flowchart outlining exemplary loading and unloading processes of, for example, the single reel tape cartridge 30 (FIG. 2) in accordance with an embodiment of the present invention is depicted. The process illustrated in FIG. 11 can be implemented in a tape drive, such as tape drive 402 (FIG. 9).

The process begins when the tape cartridge, such as tape cartridge 30 in FIG. 2, is loaded into the tape drive (process 502). A user or an automated system inserts the tape cartridge 30 into a tape drive shuttle, which will house the tape cartridge 30 while the tape cartridge 30 is in the tape drive 402 (FIG. 9). Subsequent to loading the tape cartridge 30 into the tape drive shuttle in process 502, the tape drive shuttle lowers the tape cartridge 30 onto a tape drive motor (process 504). Then, a leader coupling mechanism couples a leader, such as leader 108 (FIG. 6), to a drive reel leader, such as drive reel leader 102 in FIG. 6 (process 506).

After the leader coupling mechanism couples the leader to the drive reel leader in process 506, the drive reel leader threads the leader and a transition tape attached to the leader, such as transition tape 106 (FIG. 6), through a tape path to a tape drive take-up reel, such as tape drive take-up reel 406 (FIG. 9) in (process 508). While the transition tape is still in the tape path over the tape head, the tape drive retracts head protect pins in order to place the transition tape onto a tape head (process 510). The head protect pins may damage the magnetic recording tape, therefore it is desired to have the transition tape in the tape path during head protect pin retraction and deployment. As the transition tape continues to be advanced through the tape path onto the tape drive take-up reel, magnetic recording tape, such as primary tape portion 104 (FIG. 6), contacts the tape head 408 (FIG. 9). The tape head performs read/write operations on the magnetic recording tape (process 512).

Subsequent to the tape head 408 performing read/write operations on the magnetic recording tape in process 512, the tape drive rewinds the magnetic recording tape onto a tape cartridge reel, tape reel 36 (FIG. 2) (process 514). After the tape drive rewinds the magnetic recording tape onto the tape cartridge reel 36 in process 514 and while the transition tape is still in the tape path over the tape head, the tape drive deploys the head protect pins or places the head protect pins back into a tape head protect position (process 516).

Subsequent to head protect pin deployment in process 516, the tape drive rewinds the transition tape and the leader onto the tape cartridge reel (process 518). The leader coupling mechanism releases the leader from the drive reel leader (process 520), after the rewinding process of processes 514-518 is complete. Finally, a user or automated system unloads the tape cartridge 30 from the tape drive 402 (process 522) and the process terminates thereafter.

Various embodiments have been described above that minimizes buckling of the data storage tape during start-up and throughout read/write processing. In general, a stiffer transition tape is disclosed that withstands the lateral forces and the other deleterious contact with the tape guides of a tape drive system during tape start-up. To this end, the transition tape resists lateral buckling and establishes a stable lateral position as it is accelerated and pulled through the guides in the tape drive system. In this manner, the transition tape aligns the data storage tape between flanges of the guides, and permits the data storage tape achieve tape speeds of up to approximately 200 inches per second (i.e., speeds associated with a flying transport mode), such that ultra-thin data storage tape, for example, maintains a stable lateral position between flanges of the guides.

Although specific embodiments have been illustrated and described herein, it will be appreciated by those of ordinary skill in the art that a wide variety of alternate and/or equivalent implementations calculated to achieve the same purposes maybe substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. A data storage tape cartridge comprising:
   a housing;
   a tape reel assembly rotatably disposed within the housing, the tape reel assembly including a hub;
   a storage tape wound onto the tape reel assembly, the storage tape including a primary tape portion extending from the hub to a first end and a transition tape coupled to the first end of the primary tape portion and extending to a leading end, wherein the transition tape is thicker than the primary tape portion;
   a leader coupled to the leading end of the transition tape;
   a transition tape splice extending between the first end of the primary tape portion and a trailing end of the transition tape; and
   a leader tab splice extending between a leading end of the transition tape and the leader.

2. The data storage tape cartridge of claim 1, wherein the transition tape is thicker by a factor of at least 1.5 relative to the primary tape portion.

3. The data storage tape cartridge of claim 1, wherein die primary tape portion defines a hub end in contact with the hub and a leading end adhesively spliced to a tailing end of the transition tape.

4. The data storage tape cartridge of claim 1, wherein the transition tape defines a leading end mechanically coupled to the leader.

5. The data storage tape cartridge of claim 1, wherein the primary tape portion defines a front side including a magnetic coaling and an opposing backside, and further wherein the transition tape splice contacts the backside of the primary tape portion.

6. The data storage tape cartridge of claim 1, wherein the transition tape defines a front side including a magnetic coaling and a backside including an anti-static coating.

7. The data storage tape cartridge of claim 1, wherein the leader comprises a head that defines an aperture.

8. The data storage tape cartridge of claim 1, wherein the leader tab splice comprises a tapered leader tab splice.

9. The data storage tape cartridge of claim 1, wherein the leader tab splice comprises a length, and a portion of the length of the leader tab splice is tapered and a remaining portion of the length of the leader tab splice is of uniform thickness.

10. A storage tape for use in a data storage tape cartridge housing a tape reel assembly including a hub, the storage tape comprising:
    a magnetically coated primary tape portion attached to the hub;
    a transition tape coupled to the primary tape portion;
    a leader coupled to a leading end of the transition tape; and
    a transition tape splice extending between a first end of the primary tape portion and a trailing end of the transition tape, and a leader tab splice extending between the leading end of the transition tape and the leader;
    wherein the transition tape is thicker than the primary tape portion.

11. The storage tape of claim 10, wherein the primary tape portion defines a hub end in contact with the hub and a first end, and further wherein a trailing end of the transition tape abuts against the first end of the primary tape portion.

12. The storage tape of claim 10, wherein the transition tape is thicker by a factor between about 1.5 to 5 relative to the primary tape portion.

13. The storage tape of claim 10, wherein the primary tape portion has a thickness of less than 10 micrometers.

14. The storage tape of claim 10, wherein the transition tape defines a length of between. 0.5 and 5 feet.

15. The storage tape of claim 10, wherein the transition tape defines a front side including a magnetic coating and a backside including an anti-static coating.

16. The storage tape of claim 10, wherein the transition tape is at least 50% more resistant to lateral buckling relative to the primary tape portion.

17. A method of unwinding storage tape from a hub of a tape reel assembly housed in a data storage tape cartridge inserted into a tape drive, the method comprising:
    providing the tape reel assembly with;
       a storage tape including a primary tape portion coupled to a transition tape with a transition tape splice and
       a leader coupled to the transition tape with a leader tab splice;
    transitioning the leader tab splice and the transition tape splice through a guide of the tape drive and engaging the transition tape with the guide of the tape drive;
    accelerating the transition tape through the guide; and
    stabilizing a lateral position of the data storage tape relative to the guide.

18. The method of claim 17, wherein accelerating the transition tape through the guide includes moving the transition tape laterally relative to a face of the guide such that an edge of the transition tape touches a flange of the guide, and further wherein the transition tape does not buckle when the edge of the transition tape touches the flange of the guide at speeds between 0 and 200 inches per second.

19. The method of claim 17, wherein accelerating the transition tape through the guide includes transitioning the transition tape from a first state to a second state, the first state characterized by a backside of the transition tape contacting the guide and the second state characterized by the backside of the transition tape not contacting the guide.

20. The method of claim 17, wherein stabilizing a lateral position of the data storage tape relative to the guide includes entraining an air layer between a backside of the data storage tape and a face of the guide.

* * * * *

UNITED STATES PATENT AND TRADEMARK OFFICE
CERTIFICATE OF CORRECTION

PATENT NO.         : 7,556,215 B2
APPLICATION NO.    : 11/318117
DATED              : July 7, 2009
INVENTOR(S)        : Fred W. Livermore et al.

Page 1 of 1

It is certified that error appears in the above-identified patent and that said Letters Patent is hereby corrected as shown below:

Column 11
        Line 40, "die" should read --the--.
        Line 42, "tailing" should read --trailing--.
        Line 49, "coaling" should read --coating--.
        Lines 53 and 54, "coaling" should read --coating--.

Signed and Sealed this

Thirteenth Day of October, 2009

David J. Kappos
*Director of the United States Patent and Trademark Office*